(12) United States Patent
Geis-Esser et al.

(10) Patent No.: US 9,206,883 B2
(45) Date of Patent: Dec. 8, 2015

(54) COMPRESSOR SYSTEM AND METHOD FOR OPERATING A COMPESSOR SYSTEM

(71) Applicant: KNORR-BREMSE SYSTEME FUER NUTZFAHRZEUGE GMBH, Munich (DE)

(72) Inventors: Daniel Geis-Esser, Munich (DE); Stephan Rebhan, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 14/222,076

(22) Filed: Mar. 21, 2014

(65) Prior Publication Data

US 2014/0206494 A1   Jul. 24, 2014

Related U.S. Application Data

(63) Continuation of application No. PCT/EP2012/068486, filed on Sep. 20, 2012.

(30) Foreign Application Priority Data

Sep. 22, 2011   (DE) .......................... 10 2011 114 046

(51) Int. Cl.
*F16H 57/08* (2006.01)
*F16H 3/44* (2006.01)
*F04B 35/00* (2006.01)
*F02B 39/12* (2006.01)
*F02B 33/06* (2006.01)
*F02B 39/06* (2006.01)

(52) U.S. Cl.
CPC *F16H 3/44* (2013.01); *F02B 33/06* (2013.01); *F02B 39/06* (2013.01); *F02B 39/12* (2013.01); *F04B 35/002* (2013.01)

(58) Field of Classification Search
None
See application file for complete search history.

(56) References Cited

U.S. PATENT DOCUMENTS

| | | | | |
|---|---|---|---|---|
| 1,297,094 A | * | 3/1919 | Carr | 475/298 |
| 2,326,935 A | * | 8/1943 | Ferguson | 254/349 |
| 2,486,269 A | * | 10/1949 | Fawick | 475/147 |
| 2,870,655 A | * | 1/1959 | Rockwell | 475/142 |

(Continued)

FOREIGN PATENT DOCUMENTS

| | | |
|---|---|---|
| CN | 1222960 A | 7/1999 |
| CN | 1864019 A | 11/2006 |

(Continued)

OTHER PUBLICATIONS

International Search Report with English translation dated Jan. 22, 2013 (9 pages).

(Continued)

*Primary Examiner* — Dirk Wright
(74) *Attorney, Agent, or Firm* — Crowell & Moring LLP (57) ABSTRACT

A compressor system and a method for operating a compressor system is provided. The system includes an air compressor and a planetary gear train having an input shaft connected to a planetary carrier of the gear train and an output shaft connected the compressor and a sun gear of the gear train. A first switchable fixing device fixes one of means of which the planet carrier, the sun gear and a ring gear of the gear train with respect to an outer support, and a second switchable fixing device fixes relative to one another the two of components not fixed by the first switchable fixing device of the planetary gear train.

9 Claims, 5 Drawing Sheets

(56) References Cited

U.S. PATENT DOCUMENTS

| | | | |
|---|---|---|---|
| 4,181,042 A * | 1/1980 | Rau et al. | 475/138 |
| 4,449,604 A | 5/1984 | Suzuki | |
| 4,779,698 A * | 10/1988 | Iwata | 180/247 |
| 4,870,875 A * | 10/1989 | Morishita | 475/153 |
| 5,509,860 A * | 4/1996 | Legner | 475/129 |
| 5,700,220 A * | 12/1997 | Legner | 475/129 |
| 6,015,361 A * | 1/2000 | Yamazaki et al. | 475/230 |
| 6,949,042 B2 * | 9/2005 | Eymuller et al. | 475/140 |
| 8,403,806 B2 | 3/2013 | Haupt et al. | |
| 8,475,324 B2 * | 7/2013 | Yang | 475/324 |
| 8,517,880 B2 * | 8/2013 | Hoshino et al. | 475/183 |
| 8,574,116 B2 * | 11/2013 | Kimoto et al. | 475/318 |
| 2005/0076730 A1 | 4/2005 | Han | |
| 2009/0173318 A1 | 7/2009 | Grethel et al. | |
| 2010/0267508 A1 * | 10/2010 | Hvolka et al. | 475/149 |
| 2011/0144874 A1 | 6/2011 | Kirchner et al. | |
| 2012/0251347 A1 * | 10/2012 | Kimoto et al. | 417/319 |

FOREIGN PATENT DOCUMENTS

| | | |
|---|---|---|
| DE | 23 03 562 A1 | 8/1974 |
| DE | 32 23 102 A1 | 2/1983 |
| DE | 31 43 390 A1 | 6/1983 |
| DE | 38 10 911 A1 | 10/1988 |
| DE | 37 40 082 A1 | 6/1989 |
| DE | 39 08 225 A1 | 9/1990 |
| DE | 94 00 362 U1 | 3/1995 |
| DE | 10 2005 021 712 A1 | 11/2006 |
| DE | 10 2006 009 704 A1 | 9/2007 |
| DE | 10 2008 053 383 A1 | 5/2009 |
| DE | 10 2010 001 259 A1 | 2/2011 |

OTHER PUBLICATIONS

German Office Action dated Jul. 4, 2012 (6 pages).

International Preliminary Report on Patentability (PCT/IB/326) and (PCT/IB/373) dated Apr. 3, 2014 with Written Opinion (PCT/ISA/237) (ten (10) pages).

Chinese Office Action issued in counterpart Chinese Application No. 201280046472.X dated Aug. 4, 2015 with English translation (14 pages).

* cited by examiner

COMPRESSOR SYSTEM AND METHOD FOR OPERATING A COMPESSOR SYSTEM

CROSS REFERENCE TO RELATED APPLICATIONS

This application is a continuation of PCT International Application No. PCT/EP2012/068486, filed Sep. 20, 2012, which claims priority under 35 U.S.C. §119 from German Patent Application No. 10 2011 114 046.1, filed Sep. 22, 2011, the entire disclosures of which are herein expressly incorporated by reference.

BACKGROUND AND SUMMARY OF THE INVENTION

The present invention relates to a compressor system and a method for operating a compressor system.

In order to be able to satisfy the compressed air requirements of subsystems of modern commercial vehicles, the compressors belonging to a compressed air supply unit are often provided with a transmission ratio i<1. Here, the transmission ratio i of the speed of the driving shaft $n_{Antrieb}$, which is identical with the engine speed of the commercial vehicle, to the speed of the driven shaft $n_{Abtrieb}$, which is identical with the speed of the compressor, is defined as $i=n_{Antrieb}/n_{Abtrieb}$ and is chosen to be as small as possible.

This is advantageous since there is often an increased air requirement from the commercial vehicle, especially at low engine speeds. This is the case, for example, during container interchange or in the case of a bus approaching a stop. The latter must first of all stop there, open the doors and vent the air suspension in order to allow passengers to alight comfortably with the floor of the bus at a low level. The doors must then be closed again and the air suspension resupplied with air before starting off. Said operations consume a large amount of compressed air, which must be produced at a low engine speed.

Owing to the lower transmission ratio, the quantity of compressed air delivered is increased not only at low engine speeds but also at high engine speeds. Owing to their mechanical and thermodynamic design, compressors, which can also be referred to as air pellers or air compressors for example, have a speed limit, above which they cannot be operated reliably. On the one hand, mechanical damage can occur due to extreme loads on the compressor at high engine speeds and, on the other hand, the efficiency of the compressor falls. This applies especially because the nominal speed of the driving engine of approximately 2000 revolutions per minute may be significantly exceeded by the braking speed (approximately 2400 revolutions per minute) in the case of engine braking The problem here is that, when carrying out an engine braking operation, shutting down or relieving the load on the compressor to protect the material is often not desired since compressed air may be required for the service brake to provide additional braking of the vehicle. Indeed, this compressed air consumption should be assumed since the commercial vehicle should be braked already by the engine brake. For efficiency reasons too, shutting down or relieving the load on the compressor during an engine braking operation is furthermore not desired. This is because an engine braking operation represents an "overrun" phase, during which the driving engine is not consuming any fuel, and therefore generating compressed air during an engine braking operation is particularly energy-efficient.

It is the underlying object of the invention to provide a compressor system which resolves this conflict of aims between a maximum air delivery rate at low engine speeds and a limitation of the load on the compressor at high engine speeds with a low outlay on construction.

The present invention consists of a compressor system comprising a planetary gear train having an input shaft and an output shaft and comprising a compressor coupled to the output shaft for producing compressed air, wherein the planetary gear train comprises components that can be moved relative to one another in the form of a ring gear, a planet carrier, and a sun gear, and wherein a first switchable fixing device is provided, by which the ring gear, the planet carrier, or the sun gear can be fixed with respect to an outer support, and wherein a second switchable fixing device is provided, by which two of the components of the planetary gear train that can be moved relative to one another can be fixed with respect to one another. The input shaft and the output shaft can each be connected to one of the planetary gear train components that can be moved relative to one another. At a constant speed of the input shaft, the planetary gear train can provide at least two different speeds at the output shaft, by which the compressor can be driven. This corresponds to two different transmission ratios. In this way, a lower transmission ratio can be provided at a low speed of the input shaft, ensuring that the speed provided at the output shaft for driving the compressor is as high as possible. At a high speed at the input shaft, it is furthermore possible to provide a higher transmission ratio, with the result that the speed provided at the output shaft for driving the compressor is reduced as compared with the lower transmission ratio. To select the transmission ratio of the planetary gear train, the first switchable fixing device and the second switchable fixing device are provided, which can fix parts of the planetary gear train with respect to one another in a manner known per se. The switchable fixing devices can be pneumatically or electrically controllable multiplate clutches, for example. A combination of a synchronizing device and of a simple blocking element is likewise possible as a switchable fixing device. A synchronizer ring in combination with a sliding sleeve and suitable selector teeth is conceivable, for example. The fixing devices can furthermore have one or more actuable electric motors, which allow selective opening and closure of the fixing devices. The fixing devices can be directly or indirectly controllable by an electronic control unit, the compressor system being integrated therein, e.g. by an electronic control unit of the compressed air supply system. In the planetary gear train, the change between different transmission ratios can take place without interruption of the power flow.

According to an advantageous provision, the ring gear can be fixed with respect to an outer support by the first switchable fixing device, and the ring gear can be fixed with respect to the planet carrier by the second switchable fixing device. This special embodiment allows particularly simple implementation of the first switchable fixing device since, in general, the ring gear to be fixed with respect to the outer support encloses the other planetary gear train components that can be moved relative to one another.

Provision can be made for the input shaft to be connected to the planet carrier, and for the output shaft to be connected to a sun gear. In this way, it is possible to modify the transmission ratios that can be provided by the planetary gear train.

Provision can furthermore be made for the compressor system to comprise a control unit which controls the first switchable fixing device and/or the second switchable fixing device. Providing a control unit which controls the first switchable fixing device and/or the second switchable fixing device allows the use of the compressor system described as part of already known compressed air supply systems, it being possible, in particular, to dispense with adaptation of already existing electronic control units of a compressed air treatment system. This allows the use of the compressor system described together with any compressed air treatment systems known to the person skilled in the art.

Provision can usefully be made for the control unit to be designed to fix the ring gear with respect to the planet carrier by actuating the second switchable fixing device when a speed at the input shaft is lower than or equal to a definable threshold speed. Defining a threshold speed is an effective selection criterion for the transmission ratio to be provided by the planetary gear train. The threshold speed can be 1500 revolutions per minute, for example. In this way, the air volume delivered by the compressor at low speeds can be increased.

Provision can furthermore be made for the control unit to be designed to fix the ring gear with respect to the outer support by actuating the first switchable fixing device when a speed at the input shaft is higher than a definable threshold speed. The threshold speed can be 1500 revolutions per minute, for example. In this way, the air volume delivered by the compressor at high engine speeds can be reduced in comparison with the other possible transmission ratio in order to limit the load and the wear on the compressor.

Provision can advantageously be made for the first switchable fixing device and/or the second switchable fixing device to be pneumatically controllable.

As an alternative, it is also possible to make provision for the first switchable fixing device and/or the second switchable fixing device to be electrically controllable.

Provision can furthermore be made for the planetary gear train to be of multistage design. Using a multistage planetary gear train, i.e. a planetary gear train comprising a plurality of planetary gear sets, allows the provision of additional transmission ratios, thus making it possible to adapt the air volume delivered by the compressor in stages to the speed at the input shaft. For example, additional threshold speeds can be provided, delimiting different speed ranges of the driving engine. Each speed range thus defined can be assigned a separate transmission ratio, which can be selected in the presence of an engine speed in the respective speed range. The setting of the selected transmission ratio can be accomplished, for example, by further switchable fixing devices, which can be assigned to the further planetary gear sets. In this way, the air volume delivered by the compressor can be made more independent of the engine speed.

The invention furthermore consists of a method for operating a compressor system comprising a planetary gear train having an input shaft and an output shaft and comprising a compressor coupled to the output shaft for producing compressed air, wherein the planetary gear train comprises components that can be moved relative to one another in the form of a ring gear, a planet carrier, and a sun gear, and wherein the ring gear, the planet carrier, or the sun gear is fixed with respect to an outer support when a speed at the input shaft exceeds or falls below a definable threshold speed, and wherein two of the components that can be moved relative to one another are fixed with respect to one another when none of the components that can be moved relative to one another is fixed with respect to the outer support. In particular, the method can use any compressor systems of the kind described above.

In this way, the advantages and special features of the compressor system described can also be implemented as part of a method.

The method can be developed in a simple manner if the ring gear is fixed with respect to the planet carrier when a speed at the input shaft is lower than or equal to the definable threshold speed, and if the ring gear is fixed with respect to an outer support when the speed at the input shaft is higher than the definable threshold speed.

The advantages and special features in conjunction with the compressor system described in the dependent claims can be implemented in the same way with the method described.

Other objects, advantages and novel features of the present invention will become apparent from the following detailed description of one or more preferred embodiments when considered in conjunction with the accompanying drawings.

DETAILED DESCRIPTION OF THE DRAWINGS

In the drawings which follow, the same reference signs denote the same or similar parts.

Figure 1:
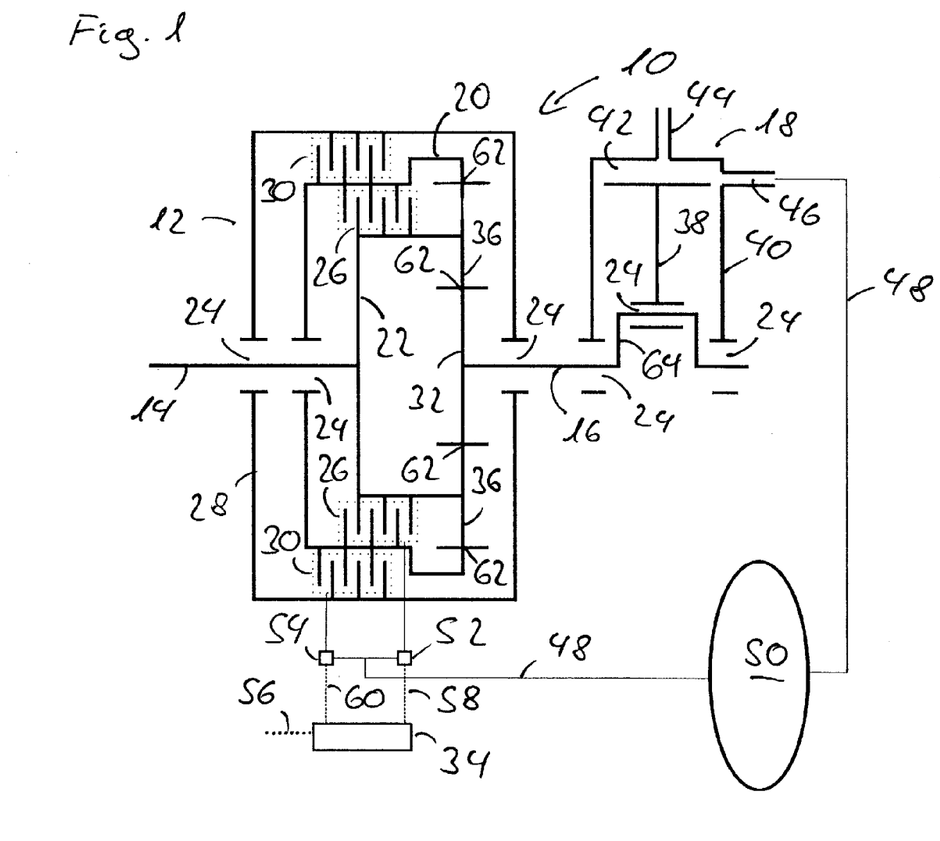
FIG. 1 shows an embodiment of a compressor system in accordance with the present invention in a first switching state.

FIG. 1 shows an embodiment of a compressor system in a first switching state. The compressor system 10 illustrated comprises a planetary gear train 12 having an input shaft 14 and an output shaft 16. A compressor 18 for producing compressed air is coupled to the output shaft 16. The planetary gear train 12 can comprise a planet carrier 22 coupled rigidly to the input shaft 14. On the side facing away from the input shaft 14, the planet carrier 22 can carry one or more planet gears 36. The planet gears 36 can mesh with a ring gear 20 and a sun gear 32 by means of teeth 62. The planet gears 36 present can be mounted so as to be rotatable with respect to the planet carrier 22. The ring gear 20 can be rotatably mounted on the input shaft 14 by a bearing assembly 24, for example. A first switchable fixing device 26, which can fix the planet carrier 22 with respect to the ring gear 20, can furthermore be provided. The first switchable fixing device 26 can be embodied as a simple multiplate clutch or as a combination of a blocking element with a synchronizing device, for example. The planetary gear train 12 can furthermore comprise an outer support 28. A second switchable fixing device 30 can be provided for fixing the ring gear 20 with respect to the outer support 28. The second switchable fixing device 30 can likewise be embodied as a simple multiplate clutch or as a combination of a mechanical blocking element and a synchronizing device. A combination of a sliding sleeve, a synchronizer ring and matching selector teeth is conceivable, for example. The first and second switchable fixing devices can also be implemented by means of other embodiments known to the person skilled in the art, which are not shown explicitly in the figure. The outer support 28 can be rotatable with respect to the input shaft 14 and the output shaft 16 by way of bearing assemblies 24. The outer support 28 can be embodied as a housing accommodating the parts of the planetary gear train 12, for example. The ring gear 20, the planet carrier 22 and the sun gear 32 can be the components of the planetary gear train 12 that can be moved relative to one another.

The compressor 18 coupled to the output shaft 16 can be embodied as a simple reciprocating piston compressor, for example. As such, the compressor 18 can comprise a crankshaft 64 which is driven by the output shaft 16 and can be rotatably mounted by bearing assemblies 24. The crankshaft 64 can, for example, drive a piston 38, which is arranged in a compressor housing 40 and produces compressed air by its periodic up-and-down movement in the compressor housing 40. For this purpose, uncompressed air can flow into a piston chamber 42 via an air inlet 44. The air which has flowed into the piston chamber 42 is compressed by the movement of the piston 38 and leaves the compressor 18 as compressed air via an air outlet 46. An unwanted return flow of air through the compressor 18, which hinders compression of the air for example, can be prevented by corresponding inlet and outlet valves at the air inlet 44 and the air outlet 46. The compressed air can be passed for further use or preparation via a compressed air line 48 connected to the air outlet 46 of the compressor 18. In this connection, purely by way of example, FIG. 1 shows a reservoir 50, which can stand as a symbol for compressed air treatment, compressed air storage and connected compressed air consuming units.

The first switchable fixing device 26 can be controlled pneumatically by a compressed air signal, using a first valve device 52. The second switchable fixing device 30 can furthermore be controlled pneumatically by a pneumatic control signal, using a second valve device 54. The first valve device 52 and the second valve device 54 can be controlled by an electronic control unit 34 via a first control line 58 and a second control line 60. The electronic control unit 34 can be coupled via a signal line 56 to a vehicle bus and/or to other control units on the vehicle, e.g. a driving engine driving the input shaft 14. The first valve device 52 and the second valve device 54 can be embodied as simple 3/2-way valves with their own venting, for example. In this way, the first switchable fixing device 26 and the second switchable fixing device 30 can each be switched between an open and a closed switching state. The open switching state of the first switchable fixing device 26 can correspond to relative rotatability of the ring gear 20 with respect to the planet carrier 22. Accordingly, the open switching state can refer to a neutral position of the first switchable fixing device 26, in which it is not in frictional engagement. The closed switching state of the first switchable fixing device 26 can correspond to fixing of the ring gear 20 with respect to the planet carrier 22. In this switching state, the ring gear 20 can be fixed with respect to the planet carrier 22. Accordingly, the closed switching state can refer to frictional coupling of the ring gear 20 to the planet carrier 22. In the same way, the open switching state of the second switchable fixing device 30 can correspond to relative mobility of the ring gear 20 with respect to the outer support 28, and the open switching state can refer to a neutral position in which it is not in frictional engagement. The closed switching state of the second switchable fixing device 30 can likewise correspond to fixing of the ring gear 20 with respect to the outer support 28, wherein the closed switching state can refer to frictional coupling of the ring gear 20 with respect to the outer support 28. The closed switching states of the first switchable fixing device 26 and the second switchable fixing device 30 can be initiated by the application of a pneumatic control pressure via the first valve device 52 or the second valve device 54, for example. The open switching states of the first switchable fixing device 26 and the second switchable fixing device 30 can likewise be assumed in the unpressurized state, i.e. without a pneumatic control signal. As an alternative to the pneumatic control illustrated, direct electrical control of the first switchable fixing device 26 and of the second switchable fixing device 30 by the control unit 34 is also possible. In this alternative embodiment, the first switchable fixing device 26 and the second switchable fixing device 30 can each comprise at least one electric motor for example, allowing selective opening and closure of the fixing devices 26, 30. When the first switchable fixing device 26 and the second switchable fixing device 30 simultaneously assume their respective open switching states, torque transmission from the input shaft 14 to the output shaft 16 can be interrupted and significant components of the planetary gear train 12 can rotate freely with respect to one another. This operating state of the planetary gear train 12 can be used to achieve efficient decoupling or separation of a driving engine and the compressor 18. The planetary gear train 12 can therefore replace or provide a clutch function. The clutch function can be provided generally by the planetary gear train 12 when torque transmission between the input shaft 14 and the output shaft 16 can be interrupted. When the first switchable fixing device 26 and the second switchable fixing device 30 are each in the closed switching states thereof, the planetary gear train 12 can be locked.

FIG. 1 illustrates the first switching state of the planetary gear train 12, in which both the first switchable fixing device 26 and the second switchable fixing device 30 are in the open switching states thereof. In this first switching state of the planetary gear train 12, the planet carrier 22, the ring gear 20 and the outer support 28 can rotate freely with respect to one another, with the result that a torque applied to the input shaft 14 is not transmitted to the output shaft 16. In the first switching position, the planetary gear train 12 freewheels and the compressor system 10 does not deliver any compressed air.

Figure 2:
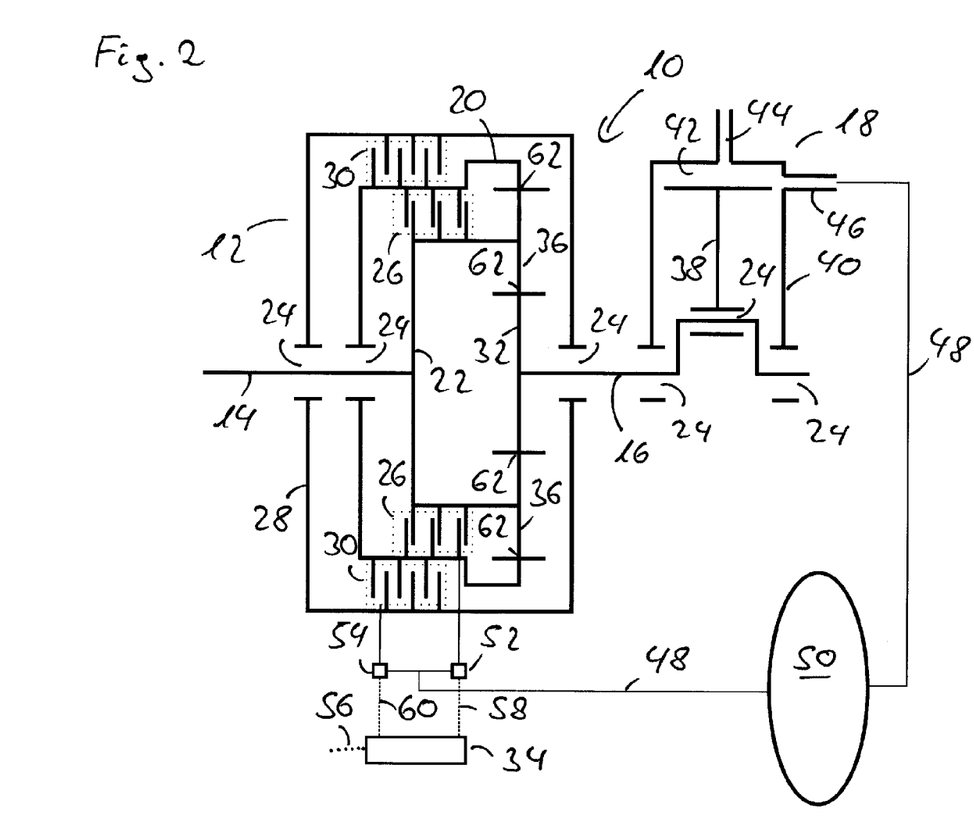
FIG. 2 shows an embodiment of a compressor system in accordance with the present invention in a second switching state.

FIG. 2 shows an embodiment of a compressor system in a second switching state. In contrast to the first switching state of the compressor system 10, which is known from FIG. 1, FIG. 2 illustrates the first switchable fixing device 26 in the closed switching position thereof. Accordingly, a pneumatic control signal is applied to the first switchable fixing device 26 via the first valve device 52, said signal having been produced by the control unit 34 by actuation of the first valve device 52 via the first control line 58. In the illustrated second switching state of the planetary gear train 12, the ring gear 20 can rotate freely with respect to the outer support 28 since the second switchable fixing device 30 is in the open switching state thereof. The ring gear 20 is fixed with respect to the planet carrier 22 by the first switchable fixing device 26, with the result that the ring gear 20 rotates in synchronism with the planet carrier 22 around an axis of rotation defined by the input shaft 14. Owing to the fixing of the ring gear 20 with respect to the planet carrier 22, the planet gears 36 carried by the planet carrier 22 cannot rotate relative to the planet carrier 22 since this is prevented by the teeth 62 between the ring gear 20 and the planet carrier 22. As a direct consequence, the sun gear 32 is driven via the planet gears 36, with the result that the output shaft 16 rotates at the same speed and in the same direction as the input shaft 14. In the second switching state, the planetary gear train 12 therefore has a transmission ratio i=1 corresponding to direct drive.

Figure 3:
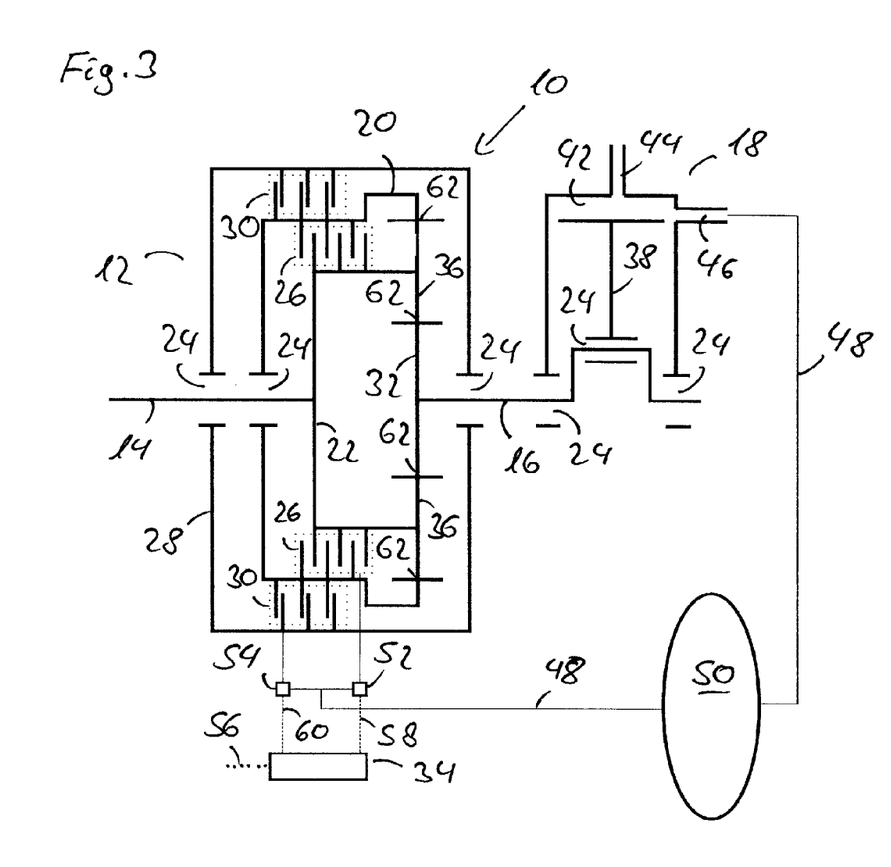
FIG. 3 shows an embodiment of a compressor system in accordance with the present invention in a third switching state.

FIG. 3 shows an embodiment of a compressor system in a third switching state. In contrast to the first switching state known from FIG. 1, in the third switching state, which is illustrated in FIG. 3, the second switchable fixing device 30 is in the closed switching state thereof, while the first switchable fixing device 26 is in the open switching state thereof. The planet carrier 22 is thus freely rotatable with respect to the ring gear 20, while the ring gear 20 is fixed with respect to the outer support 28. By way of rotation of the planet carrier 22, rotation of the input shaft 14 leads to rotation of the planet gears 36 relative to the ring gear 20 since the planet gears 36 are coupled to the ring gear 20 via the teeth 62. The rotation of the planet gears 36 induces rotation of the sun gear 32 and hence of the output shaft 16, wherein the sun gear 32 rotates more rapidly than the driving planet carrier 22. The transmission ratio can be determined from the following equation $$i = \frac{1}{1 - \frac{z_h}{z_s}}$$

wherein $z_h$ is the number of teeth on the ring gear 20 (negative internal) and $z_s$ is the number of teeth on the sun gear 32. In the third switching state of the planetary gear train 12, the compressor 18 is thus operated at a higher speed than the input speed at the input shaft 14.

In FIGS. 1 to 3, the planetary gear train 12 comprises just a single planetary gear set. Using a plurality of planetary gear sets in a manner known per se to the person skilled in the art, e.g. by connecting a plurality of planetary gear sets in series, additional switching states of the planetary gear train 12 can be obtained, which provide further transmission ratios in accordance with the principle of a multispeed transmission.

The input shaft 14 can be driven by a driving engine, in particular a driving engine of a vehicle, via belts or via a gear wheel, for example. The compressor system 10 with planetary gear train 12 makes it possible, when required, to decouple the compressor 18 from the driving engine and to achieve the delivery rate of the compressor 18 by increasing the speed of the output shaft 16 while keeping the speed of the input shaft 14 constant. The change between the possible transmission ratios is possible without interrupting the power flow from the input shaft 14 to the output shaft 16. If, for example, no compressed air delivery is required, the planetary gear train 12 can be switched in such a way that the input shaft 14 is freely rotatable with respect to the output shaft 16 and the compressor 18 is stationary. If, however, a large quantity of compressed air is required quickly or there is excessive motive power present, e.g. in an overrun mode, in which the driving engine of the vehicle is used as an engine brake, then, depending on the speed at the input shaft 14, the speed provided at the output shaft 16 can be set to drive the compressor 18 by selecting the transmission ratio of the planetary gear train.

Depending on requirements, the input shaft 14 and the output shaft 16 can also be connected to other components of the planetary gear train 12 that can be rotated relative to one another, wherein the first switchable fixing device 26 and the second switchable fixing device 30 can simultaneously be rearranged in a manner known per se in order to allow suitable fixing between individual components of the planetary gear train. In general, that component of the planetary gear train 12 which is not connected to the input shaft 14 or the output shaft 16 in these embodiments that are not illustrated in the figures can be fixable, i.e. can be capable of being coupled for conjoint rotation, with respect to the support 28 by the first switchable fixing device 26. In these embodiments that are not illustrated, coupling for conjoint rotation, by the second switchable fixing device 30, between two of the components of the planetary gear train 12 that are rotatable relative to one another can furthermore generally provide a different transmission ratio between the input shaft 14 and the output shaft 16.

The different connections and arrangements of the two fixing devices 26, 30, can be used to alter the ratio of the input shaft speed to the output shaft speed, i.e. the transmission ratio of the planetary gear train 12, can be modified in a manner known per se without having to change the number of teeth on the ring gear 20 and the sun gear 32. It is possible, in a simple manner, for example, to exchange the input shaft 14 with the output shaft 16 in order to obtain a different embodiment with modified transmission ratios.

Figure 4:
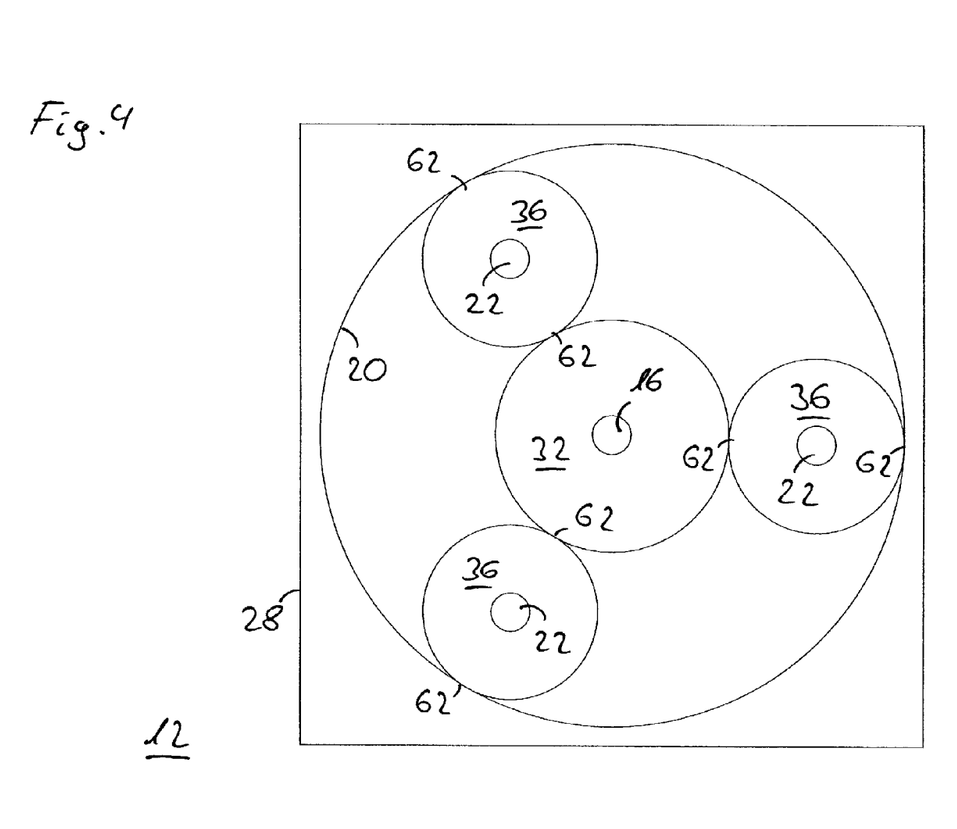
FIG. 4 shows a schematic illustration of an embodiment of a planetary gear train in accordance with the present invention.

FIG. 4 shows a schematic illustration of a planetary gear train. The schematically illustrated planetary gear train 12 comprises the outer support 28, which is illustrated as a housing and which accommodates the other illustrated components of the planetary gear train 12. The ring gear 20 and, concentrically with the ring gear 20, the sun gear 32 are arranged in the interior of the outer support 28. The sun gear 32 is connected for conjoint rotation to the output shaft 16. Three planet gears 36, which are rotatably supported by the planet carrier 22, are illustrated between the sun gear 32 and the ring gear 20. The ring gear 20 can be an internal gear wheel. The sun gear 32 and the planet gears 36 can be normal gear wheels. The sun gear 32, the planet gears 36 and the ring gear 20 can transmit forces to one another via the teeth 62 in the manner illustrated. The number of planet gears 36 illustrated in FIG. 4 can be varied as required.

Figure 5:
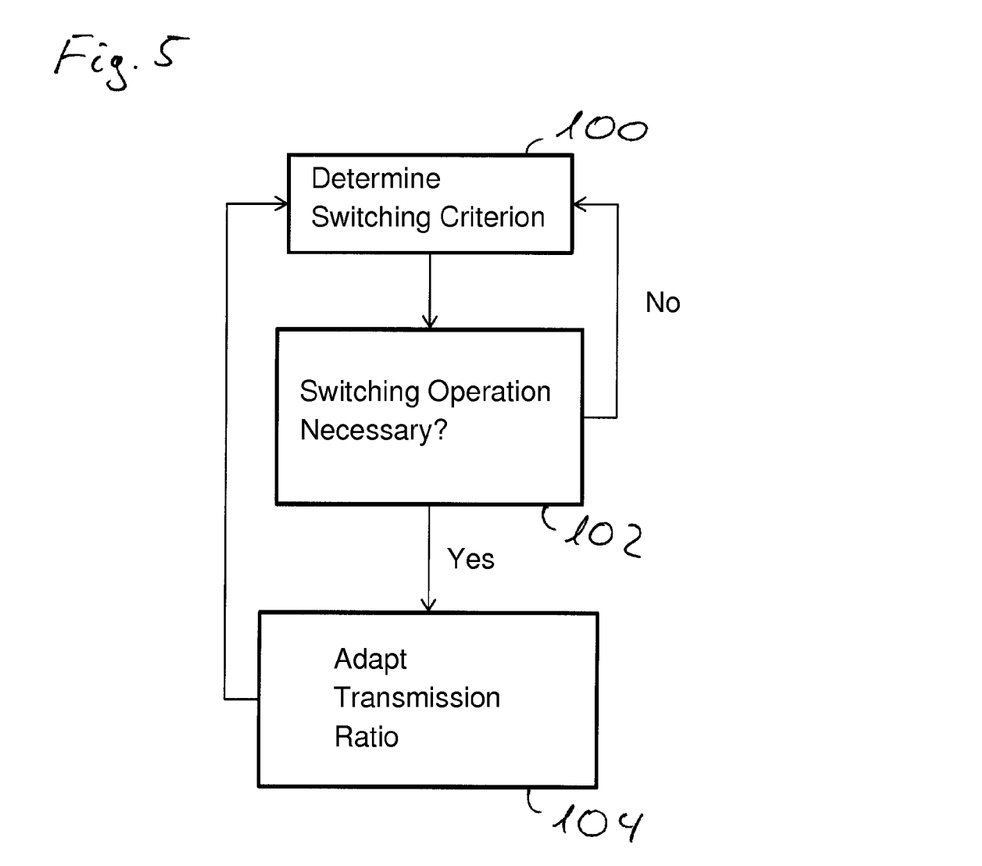
FIG. 5 shows a flow diagram to illustrate a method embodiment in accordance with the present invention.

FIG. 5 shows a flow diagram to illustrate the method. The method can begin by determination of a switching criterion in step 100. The switching criterion can be the speed provided at the input shaft of the planetary gear train, for example. The use of the speed of the engine driving the input shaft is also conceivable. Another possible switching criterion is the compressed air requirement. If no compressed air is required because there is already an adequate amount of compressed air stored, the compressor system can stop producing compressed air until compressed air is required again. It is also conceivable to use the temperature of the compressor as a switching criterion since the temperature of the compressor can serve as a measure of wear. The speed of the input shaft and the speed of the driving engine driving the input shaft can be determined directly by means of corresponding speed sensors, for example. The temperature of the compressor can be determined by a correspondingly arranged temperature sensor, for example. A speed sensor can furthermore be provided for determining the speed of the output shaft. The values determined in this way can be transmitted to the appropriate control unit, e.g. a control unit of the compressor system. Following step 100, the necessity of a switching operation can be determined in step 102, taking into account the switching criterion determined or the switching criteria determined. Here, a switching operation is taken to mean the transfer of the planetary gear train out of its current switching state, which provides a different transmission ratio of the planetary gear train. For example, it is possible to define speed ranges, each of which is assigned to a particular transmission ratio of the planetary gear train. Thus, the speed ranges can be selected with reference to the switching criterion or criteria determined. If the speed measured by a speed sensor, on the input shaft for example, leaves a defined speed range, e.g. by overshooting or undershooting a threshold value delimiting the speed range, and is then in a different speed range, which is assigned to a different transmission ratio, actuation of the switchable fixing devices to transfer the planetary gear train to a different switching state by the control unit can be provided. Similarly, a transmission ratio can be selected on the basis of a measured temperature of the compressor. In addition, given an adequate supply of compressed air, delivery of compressed air can be ended if a different switching criterion permits a transmission ratio deviating therefrom. The various criteria can be evaluated independently of one another, for example. In order to prevent impermissibly high loading of the compressor, it is possible, where there are several switching criteria, always to select the highest transmission ratio that can be derived from the individual switching criteria. By actuation of the switchable fixing devices, the transmission ratio of the planetary gear train can be adapted, this being carried out in step 104, for example. If no switching operation is necessary, no in step 102, the program can continue directly with step 100. The program can also continue again in step 100 with the determination and monitoring of the switching criterion after the transmission ratio has been adapted in step 104.

The features of the invention which are disclosed in the above description, in the drawings and in the claims may be essential for the implementation of the invention either individually or in any combination.

LIST OF REFERENCE SIGNS

10 compressor system
12 planetary gear train
14 input shaft
16 output shaft
18 compressor
20 ring gear
22 planet carrier
24 bearing assembly
26 first switchable fixing device
28 outer support
30 second switchable fixing device
32 sun gear
34 control unit
36 planet gear
38 piston
40 compressor housing
42 piston chamber
44 air inlet
46 air outlet
48 compressed air line
50 reservoir
52 first valve device
54 second valve device
56 signal line
58 first control line
60 second control line
62 teeth
64 crankshaft
100 determine switching criterion
102 switching operation necessary?
104 adapt transmission ratio The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A compressor system, comprising
    a planetary gear train having an input shaft, an output shaft, a ring gear, a sun gear and a planet carrier carrying at least one planet gear;
    a compressor coupled to the output shaft for producing compressed air; and
    a control unit configured to control at least one of a first switchable fixing device and a second switchable fixing device based on switching criteria that are evaluated by the control unit independently from each other for choosing a transmission ratio,
    wherein
        the ring gear is fixable with respect to an outer support by the first switchable fixing device and is fixable with respect to the planet carrier by the second switchable fixing device, and
        the control unit is configured to select the highest transmission ratio derivable from the individual switching criteria.

2. The compressor system as claimed in claim 1, wherein the input shaft is connected to the planet carrier, and the output shaft is connected to the sun gear.

3. The compressor system as claimed in claim 1, wherein the control unit is configured to actuate the second switchable fixing device to fix the ring gear with respect to the planet carrier when a speed at the input shaft is lower than or equal to a defined threshold speed.

4. The compressor system as claimed in claim 1, wherein the control unit is configured to actuate the first switchable fixing device to fix the ring gear with respect to the outer support when a speed at the input shaft is higher than a defined threshold speed.

5. The compressor system as claimed in claim 3, wherein the control unit is configured to actuate the first switchable fixing device to fix the ring gear with respect to the outer support when a speed at the input shaft is higher than a defined threshold speed.

6. The compressor system as claimed in claim 1, wherein at least one of the first switchable fixing device and the second switchable fixing device are pneumatically controllable.

7. The compressor system as claimed in claim 1, wherein at least one of the first switchable fixing device and the second switchable fixing device are electrically controllable.

8. A method for operating a compressor system comprising a planetary gear train having an input shaft, an output shaft, a ring gear, a sun gear and a planet carrier carrying at least one planet gear, a control unit configured to control a first switchable device and a second switchable device, and a compressor coupled to the output shaft for producing compressed air, the ring gear being fixable with respect to an outer support by the first switchable fixing device and fixable with respect to the planet carrier by the second switchable fixing device, comprising the acts of:
    fixing the ring gear with respect to the outer support; or
    fixing with respect to one another the ring gear and the planet carrier based on switching criteria that are evaluated by the control unit independently from each other for choosing a transmission ratio,
    wherein the control unit is configured to select the highest transmission ratio derivable from the individual switching criteria.

9. The method as claimed in claim 8, wherein
    the ring gear is fixed with respect to the planet carrier when the speed of the input shaft is lower than or equal to a defined threshold speed, and
    the ring gear is fixed with respect to the outer support when the speed of the input shaft is higher than the defined threshold speed.

* * * * *